United States Patent
Tetsumoto (10) Patent No.: US 6,751,593 B2
(45) Date of Patent: Jun. 15, 2004

(54) DATA PROCESSING SYSTEM WITH BLOCK ATTRIBUTE-BASED VOCALIZATION MECHANISM

(75) Inventor: Hideo Tetsumoto, Aichi (JP)

(73) Assignee: Fujitsu Limited, Kawasaki (JP)

( * ) Notice: Subject to any disclaimer, the term of this patent is extended or adjusted under 35 U.S.C. 154(b) by 442 days.

(21) Appl. No.: 09/779,499

(22) Filed: Feb. 9, 2001

(65) Prior Publication Data

US 2002/0002462 A1 Jan. 3, 2002

(30) Foreign Application Priority Data

Jun. 30, 2000 (JP) ...................................... 2000-197931

(51) Int. Cl.[7] .............................................. G10L 13/00
(52) U.S. Cl. .................. 704/270.1; 704/270; 379/90.01
(58) Field of Search ............................ 704/270, 270.1, 704/256; 379/88.01, 90.01; 709/218, 246

(56) References Cited

U.S. PATENT DOCUMENTS 6,240,448 B1 * 5/2001 Imielinski et al. .......... 709/218
6,243,713 B1 * 6/2001 Nelson et al. ............ 707/104.1

FOREIGN PATENT DOCUMENTS

| JP | 08083089 A | 3/1996 |
| JP | 10164249 A | 6/1998 |

* cited by examiner

Primary Examiner—Susan McFadden
(74) Attorney, Agent, or Firm—Staas & Halsey LLP (57) ABSTRACT

A data processing unit which vocalizes web page data, including non-textual information contained therein, such as font size specifications. A call reception unit accepts a call signal from a user's telephone set. A speech recognition unit recognizes the user's verbal messages received from the telephone set. When a request for a particular web page is detected by the speech recognition unit, a web page data collector makes access to the requested web page to obtain its web page data. A text data extractor extracts every block of text data from the obtained web page data. An attribute extractor extracts attributes of each block extracted by the text data extractor. A vocalization order decision unit determines in what order to vocalize the blocks, evaluating the attributes of each block extracted by the attribute extractor. A vocalizer converts text data contained in the blocks into speech, based on the block vocalization order determined by the vocalization order decision unit.

10 Claims, 13 Drawing Sheets

```
<div align="center">
<center>
<table border="1" width="487" height="269">
<tr>
<td width="173" height="129">
<p align="center"><font size="6">Election Started among 1,400 Candidates
</font></td>
<td width="141" height="269" rowspan="2">
<img border="0" src="C:/a.bmp"></td>
<td width="151" height="269" rowspan="2">
<font size="2">- Summit Meeting between
North and South Korea</font>
<p><font size="2">- Congressional Election</font></p>
<p><font size="2">- New York Stock Exchange</font></p>
<p><font size="2">- Ecology Project</font></p>
<p><font size="2">- Beating Summer Blahs</font></td>
</tr>
<tr>
<td width="173" height="128"><font size="3">This year's congressional election has started. More than 1,400 candidates have made registration as of 4:00 pm. </font></td>
</tr>
</table>
</center>
</div>
```

FIG. 7

| ELEMENT ID | TEXT LENGTH | ATTRIBUTE | DATA | ORDER |
|---|---|---|---|---|
| ELE001 | 39 BYTES | TEXT | Election Started among 1,400 Candidates | 1 |
| ELE002 | 109 BYTES | TEXT | This year's congressional election has ... | 2 |
| ELE003 | 138 BYTES | TEXT | – Summit Meeting between North and ... | 3 |

```
<body>

<h1 align="center">MUSIC CHART OF THE WEEK</h1>

<p align="center"> </p>

<p align="left">#1 GRANDSON --- Akira Asada</p>

<p align="left">#2 JUVENILE --- Takako Inamori</p>

<p align="left">#3 DHARMA --- Takao Shiina</p>

<p align="left">#4 LAST LOVE --- Arisa Utada</p>

</body>
```

FIG. 11

| ELEMENT ID | TEXT LENGTH | ATTRIBUTE | DATA |
|---|---|---|---|
| ELE001 | 27 BYTES | TEXT | #1 GRANDSON --- Akira Asada |
| ELE002 | 30 BYTES | TEXT | #2 JUVENILE --- Takako Inamori |
| ELE003 | 26 BYTES | TEXT | #3 DHARMA --- Takao Shiina |
| ELE004 | 28 BYTES | TEXT | #4 LAST LOVE --- Arisa Utada |

FIG. 12

| ELEMENT ID | SUBSTITUTIVE DATA |
|---|---|
| ELE001 | grandson.mp3 |
| ELE002 | juvenile.mp3 |
| ELE003 | dharma.mp3 |
| ELE004 | last_love.mp3 |

FIG. 13

DATA PROCESSING SYSTEM WITH BLOCK ATTRIBUTE-BASED VOCALIZATION MECHANISM

BACKGROUND OF THE INVENTION

1. Field of the Invention

The present invention relates to a data processing system, and more particularly to a data processing system which provides the user with vocalized information of web pages that are written in a markup language.

2. Description of the Related Art

Today's expanding Internet infrastructure and increasing amounts of web content have enabled us to utilize various information resources available on the networks. While it is definitely useful, the Internet is not equally accessible to everyone. One of the obstacles to Internet access is that people must be able to afford to buy a personal computer and subscribe to an Internet connection service. Another obstacle may be that it requires some knowledge about how to operate a personal computer. Such computer literacy, however, is not in the possession of everybody. Particularly, most resources on the Internet are intended for browsing on a monitor and not designed for people who have a visual impairment or weak eyesight. For those handicapped people, the Internet is not necessarily a practical information source.

To solve the above problems with Internet access, the Japanese Patent Laid-open Publication No. 10-164249 (1998) proposes a system which vocalizes web page content by using speech synthesis techniques for delivery to the user over a telephone network. This system, however, only provides a simple text-to-speech conversion, meaning that what it is limited to the delivery of plain text information, but cannot transfer other meaningful information that may be contained in the document. For example, most web pages use more than one font sizes to emphasize or deemphasize some particular part of the document. That is, the font size carries the author's intention of placing different importance on some passages in the text. Such non-textual information cannot be transferred by the conventional vocalization techniques. Another example is the use of images. While many web pages rely on visual representation of information, such as pictures, illustrations, drawings, and any other formats, the conventional system would completely filter them out.

SUMMARY OF THE INVENTION

Taking the above into consideration, an object of the present invention is to provide a data processing system which vocalizes information available on the Internet, including as much non-textual information as possible.

To accomplish the above object, according to the present invention, there is provided a data processing system which provides a user with vocalized information of web pages that are written in a markup language. This system comprises the following elements: a call reception unit which accepts a call from the user's telephone set; a speech recognition unit which recognizes a verbal message being received from the user's telephone set; a web page data collector which makes access to a particular web page to obtain web page data therefrom, when a request for that web page is recognized by the speech recognition unit; a text data extractor which extracts text data from the obtained web page data on a block basis; an attribute extractor which extracts attributes of each of the blocks of text data extracted by the text data extractor; a vocalization order decision unit which determines in what order to vocalize the blocks, based on the attributes extracted by the attribute extractor; and a vocalizer for vocalizing the text data contained in each block, according to the vocalization order that is determined by the vocalization order decision unit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
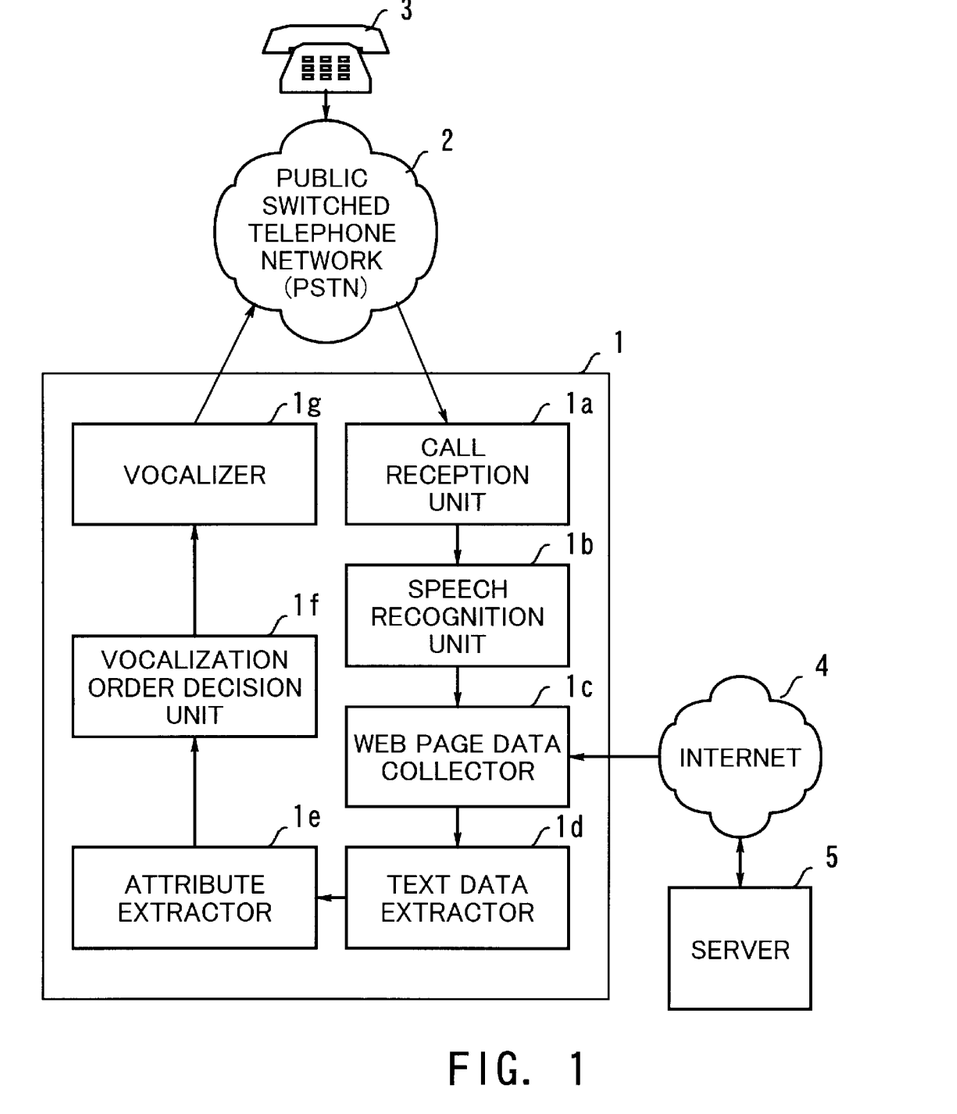
FIG. 1 is a conceptual view of a data processing system according to the present invention.

FIG. 1 is a conceptual view of a data processing system according to the present invention. This proposed data processing system 1 is connected to a telephone set 3 through a public switched telephone network (PSTN) 2, which allows them to exchange voice signals. The telephone set 3 converts the user's speech into an electrical signal and sends it to the data processing system 1 over the PSTN 2. The Internet 4 serves as a data transmission medium between the data processing system 1 and a server 5, transporting text, images, voice, and other information. The server 5 is one of the world wide web servers on the Internet 4. When requested, the server 5 provides the data processing system 1 with its stored web page data written in a markup language such as the Hypertext Markup Language (HTML).

The proposed data processing system 1 comprises a call reception unit 1a, a speech recognition unit 1b, a web page data collector 1c, a text data extractor 1d, and an attribute data extractor 1e, a vocalization order decision unit 1f, and a vocalizer 1g. These elements provide information processing functions as follows.

The call reception unit 1a accepts a call initiated by the user of the telephone set 3. The speech recognition unit 1b recognizes the user's verbal messages received from the telephone set 3. When the speech recognition unit 1b has detected a request for a particular web page, the web page data collector 1c makes access to the requested page to obtain its web page data. The text data extractor 1d extracts text data contained in the obtained web page data on a block basis. The attribute extractor 1e extracts attributes of each block supplied from the text data extractor 1d. The vocalization order decision unit 1f determines in what order to vocalize the blocks, according to the attributes of each block which have been extracted by the attribute extractor 1e. The vocalizer 1g vocalizes text data contained in each block, based on the block order determined by the vocalization order decision unit 1f, and sends the resultant speech signal to the telephone set 3 over the PSTN 2.

The above data processing system 1 operates as follows. Suppose that the user has lifted his handset off the hook, which makes the telephone set 3 initiate a call to the data processing system 1 by dialing its preassigned phone number. This call signal is delivered to the data processing system 1 over the PSTN 2 and accepted at the call reception unit 1a. The telephone set 3 and data processing system 1 then set up a circuit connection between them, thereby starting a communication session.

Now that the communication channel has been established, the telephone user issues a voice command, such as "Connect me to the homepage of ABC Corporation." The PSTN 2 transports this voice signal to the speech recognition unit 1b in the data processing system 1. With an appropriate voice recognition algorithm, the speech recognition unit 1b identifies the user's verbal message as a command that requests the system 1 to make access to the homepage of ABC Corporation. Then the call reception unit 1a so notifies the web page data collector 1c.

In response to the user's request, the web page data collector 1c fetches web page data from the web site of ABC Corporation, which is located on the server 5. The web page data containing, for example, an HTML-coded document is transferred over the Internet 4. The web page data obtained as such is passed to the text data extractor 1d, which extracts every block of text data from the obtained web page data. Suppose, for example, that the front page (i.e., the first appearing page) of the ABC Corporation's web site consists of three parts: title block, menu block, and abstract block. The text data extractor 1d extracts those blocks individually. Every extracted text block has its own attributes, including: the font size, the number of characters, the number of hyperlinks contained. The attribute extractor 1e extracts such attributes of each block supplied from the text data extractor 1d.

The attribute extractor 1e supplies the attributes of each block to the vocalization order decision unit 1f. Based on this information, the vocalization order decision unit 1f determines in what order those blocks should be vocalized. For example, the vocalization order decision unit 1f gives first place to the block using the largest font size, because the web page content displayed with a larger character size is supposed to be of a greater importance. This decision is then passed to the vocalizer 1g, so that the blocks will be read out in that specified order. In the present example, the three blocks of the ABC Corporation's front page are vocalized in descending order of font size (e.g., title, abstract, and then menu). The PSTN 2 delivers the vocalized text information to the telephone set 3, allowing the user to hear the desired web page content in the order of importance.

As described above, the proposed data processing system collects web page data on the Internet according to a verbal command from the user, extracts text on a block basis, and vocalizes these text blocks in an appropriate order which is determined on the basis of their attributes. This feature of the present invention will enable the user to receive each piece of information contained his/her desired web page, being prioritized according to the importance. While the above section has proposed the use of font size information to determine the order, the present invention is not to be limited to this specific criterion. The blocks may also be evaluated by their text lengths, for example.

Figure 2:
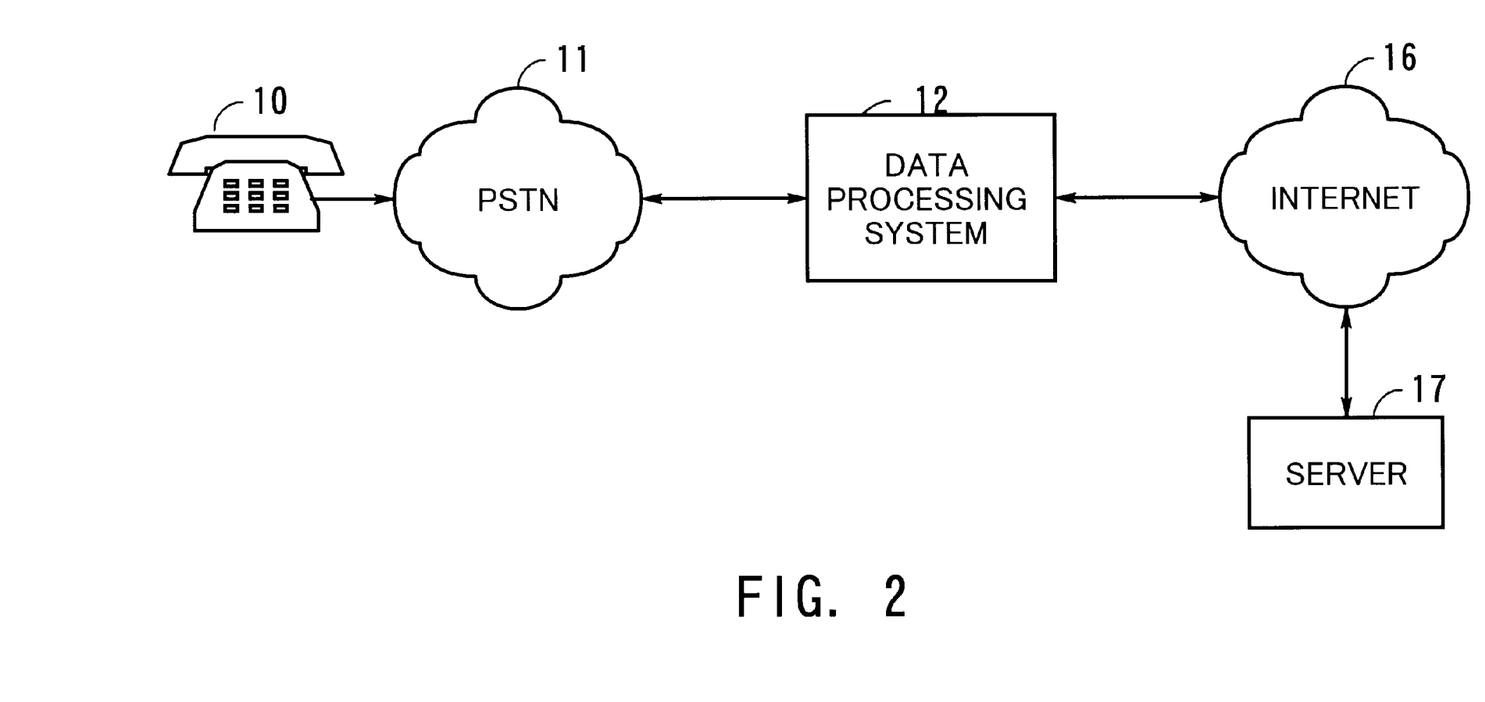
FIG. 2 illustrates an environment where the present invention is embodied.

A more specific embodiment of the present invention will now be described below with reference to FIGS. 2 and 3. First, FIG. 2 illustrates an environment where the present invention is embodied. At the user's end of this system, a telephone set 10 converts the user's speech into an electrical signal for transmission to a remote data processing system 12 over a PSTN 11. The telephone set 10 also receives a voice signal from the data processing system 12 and converts it back to an audible signal.

Upon receiving a call from the user via the PSTN 11, the data processing system 12 sets up a circuit connection with the calling telephone set 10. When a voice command is received, it downloads web page data from the desired web site at the server 17. After manipulating the obtained data with predetermined rules, the data processing system 12 performs a text-to-speech conversion to send a voice signal back to the telephone set 10.

The Internet 16 serves as a medium between the data processing system 12 and server 17, supporting the Hyper Text Transfer Protocol (HTTP), for example, to transport text, images, voice, and other types of information. The server 17 is a web server which stores documents that are written in the HTML format. When a web access command is received from the data processing system 12, the server 17 provides the requested web page data to the requesting data processing system 12.

Figure 3:
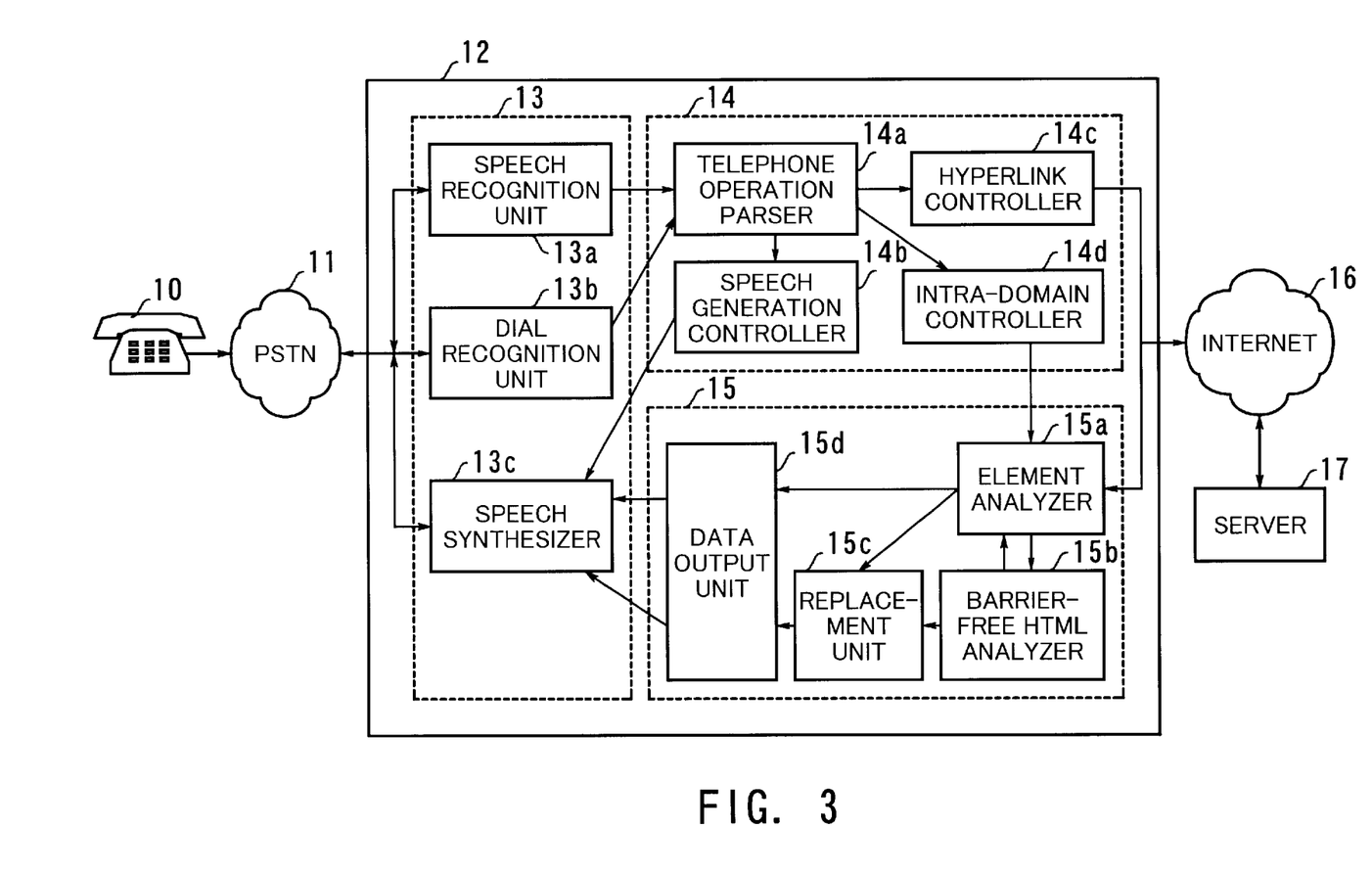
FIG. 3 is a detailed block diagram of a proposed data processing system shown in FIG. 2.

FIG. 3 is a detailed block diagram of the proposed data processing system 12 shown in FIG. 2. As seen from this diagram, the data processing system 12 is broadly divided into the following three parts: a voice response unit 13 which interacts with the telephone set 10; a browser unit 14 which downloads web page data from the server 17; and an HTML analyzer unit 15 which analyzes the downloaded web page data.

The voice response unit 13 comprises a speech recognition unit 13a, a dial recognition unit 13b, and a speech synthesizer 13c. The speech recognition unit 13a analyzes the voice signal sent from the telephone set 10 to recognize the user's message and notifies the telephone operation parser 14a of the result. The dial recognition unit 13b monitors the user's dial operation. When it detects a particular sequence of dial tones or pulses, the dial recognition unit 13b notifies the telephone operation parser 14a of the detected sequence. The speech synthesizer 13c receives text data from the data output unit 15d. Under the control of the speech generation controller 14b, the speech synthesizer 13c converts this text data into a speech signal for delivery to the telephone set 10 over the PSTN 11.

While some elements have already been mentioned above, the browser unit 14 comprises a telephone operation parser 14a, a speech generation controller 14b, a hyperlink controller 14c, and an intra-domain controller 14d. The telephone operation parser 14a analyzes a specific voice command or dial operation made by the user. The result of this analysis is sent to the speech generation controller 14b, hyperlink controller 14c, and intra-domain controller 14d. The speech generation controller 14b controls synthetic speech generation which is performed by the speech synthesizer 13c. The hyperlink controller 14c requests the server 17 to send the data of a desired web page. The intra-domain controller 14d controls the movement of a pointer within the same site (i.e., within a domain that is addressed by a specific URL). The movement may be made from one line to the next line, or from one paragraph to another.

The HTML analyzer unit 15 comprises the following functional components: an element structure analyzer 15a, a barrier-free HTML analyzer 15b, a replacement unit 15c, and a data output unit 15d. The element structure analyzer 15a analyzes the structure of HTML elements that constitute the web page of interest. If the web page data contains a certain extended HTML tag (described later), the barrier-free HTML analyzer 15b looks into the details of that tag and sends the result back to the element structure analyzer 15a. The replacement unit 15c replaces a part of the web page data with another piece of information. The output unit 15d transfers the processed web page data from the element structure analyzer 15a and replacement unit 15c to the speech synthesizer 13c.

Figure 4:
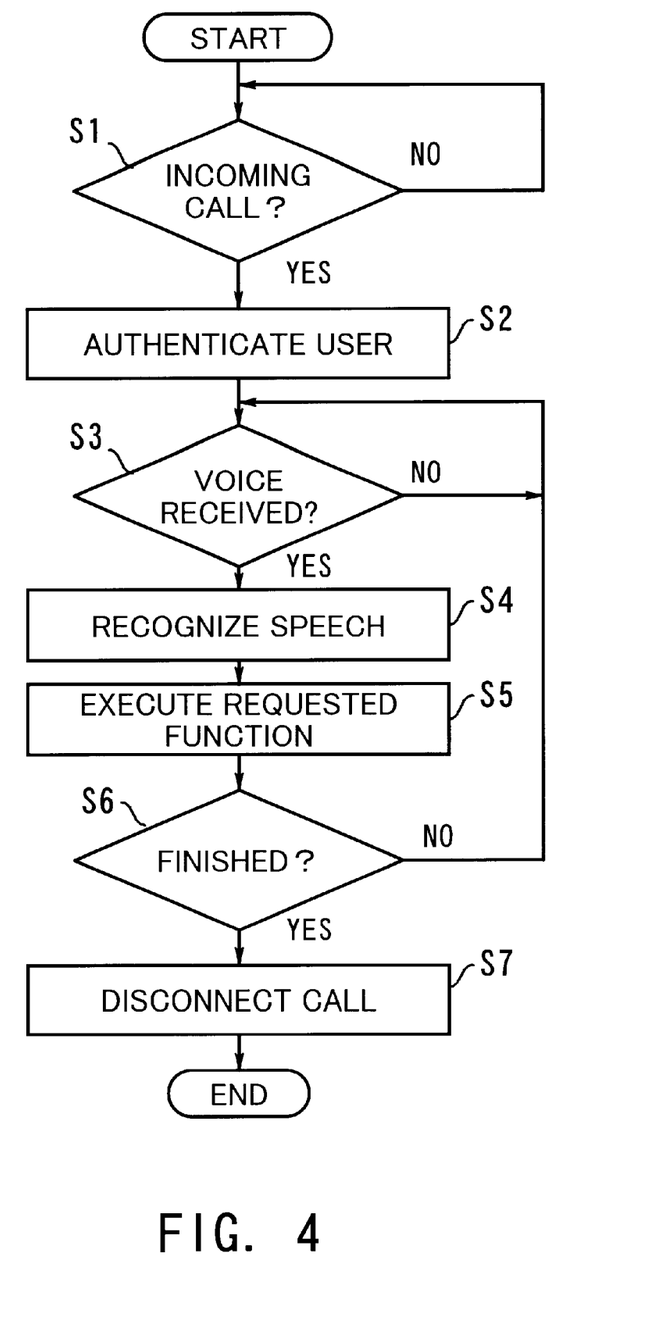
FIG. 4 is a flowchart which explains how a call is processed in the embodiment shown in FIG. 3.

The operation of the present embodiment of the invention will now be described below. FIG. 4 is a flowchart which explains how the data processing system 12 accepts and processes a call from the telephone set 10. The process, including establishment and termination of a circuit connection, comprises the following steps.

(S1) When a call is received from a user, the data processing system 12 advances its process step to S2. Otherwise, the process repeats this step S1 until a call arrives.

(S2) The user enters his/her password by operating the dial buttons or rotary dial of the telephone set 10. With this password, the telephone operation parser 14a authenticates the requesting user's identity. Since the user authentication process, however, is optional, the step S2 may be skipped.

(S3) The speech recognition unit 13a determines whether any verbal message is received from the user. If any message is received, the process advances to step S4. If not, this step S3 is repeated until any message is received.

(S4) The speech recognition unit 13a analyzes and recognizes the received verbal message.

(S5) The browser unit 14 performs the user's intended operation if it is recognized at step S4. More specifically, the user may request the system to connect himself/herself to a certain web page. If this is the case, the hyperlink controller 14c visits the specified web site and downloads that page.

(S6) The data processing system 12 determines whether the current communication session is ending. If so, the process advances to step S7. If not, the process returns to step S3 and repeats the command processing described above.

Suppose, for example, that the user has put down the handset. This user action signals the data processing system 12 that the circuit connection has to be disconnected because the call is finished. The data processing system 12 then proceeds to step S7, accordingly.

(S7) The data processing system 12 disconnects the circuit connection that has been used to interact with the telephone set 10.

The above processing steps allow the user to send a command to the data processing system 12 by simply uttering it or by operating the dial of his/her telephone set 10. The data processing system 12 then executes requested functions according to the command.

Figure 5:
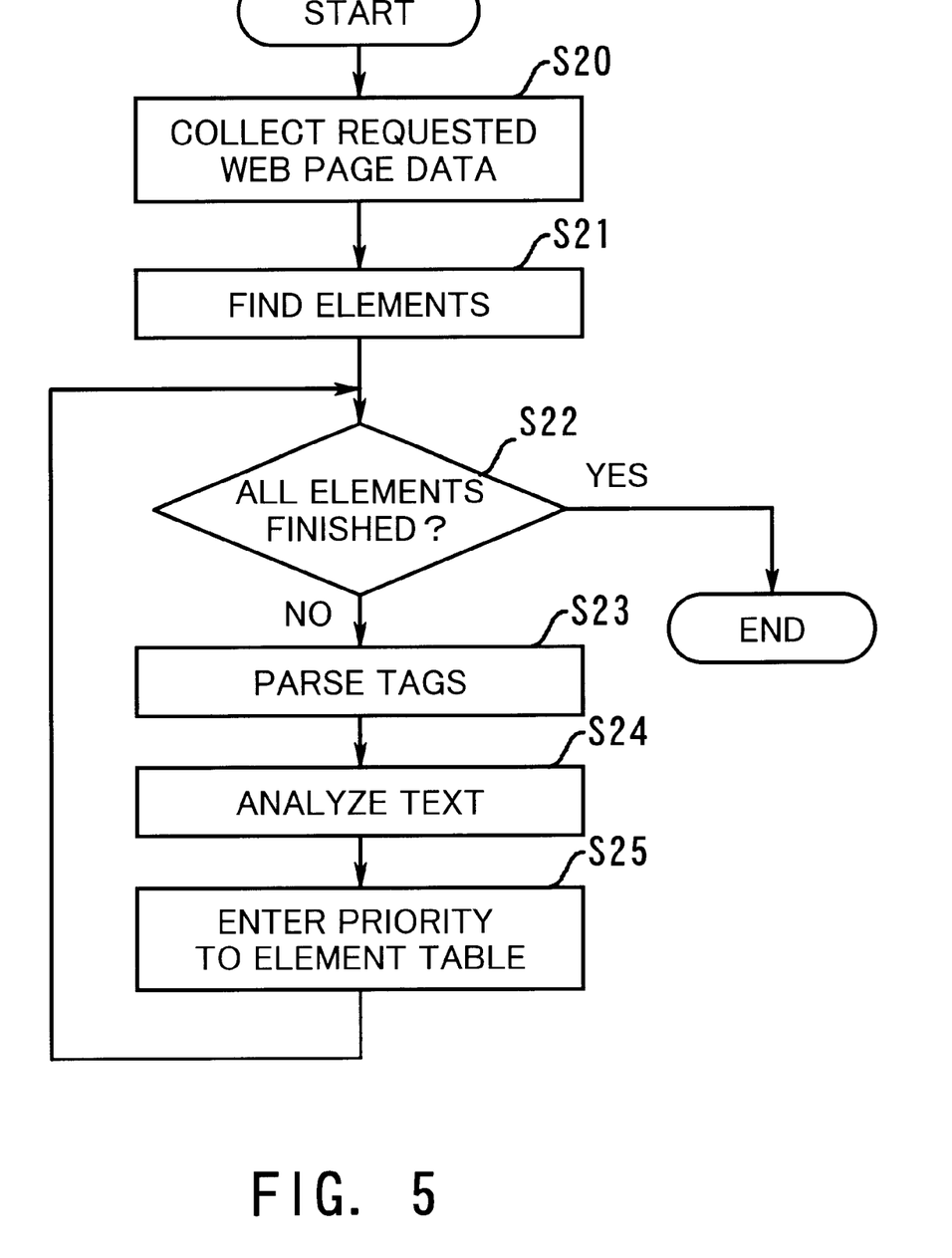
FIG. 5 is a flowchart of a process to determine in what order to vocalize element blocks.

According to a first aspect of the present invention, the proposed data processing system extracts text from web page data on a block basis and vocalizes those text blocks in an appropriate order which is determined on the basis of their attributes. FIG. 5 is a flowchart showing the details of this processing, which comprises the following steps.

Figure 6:
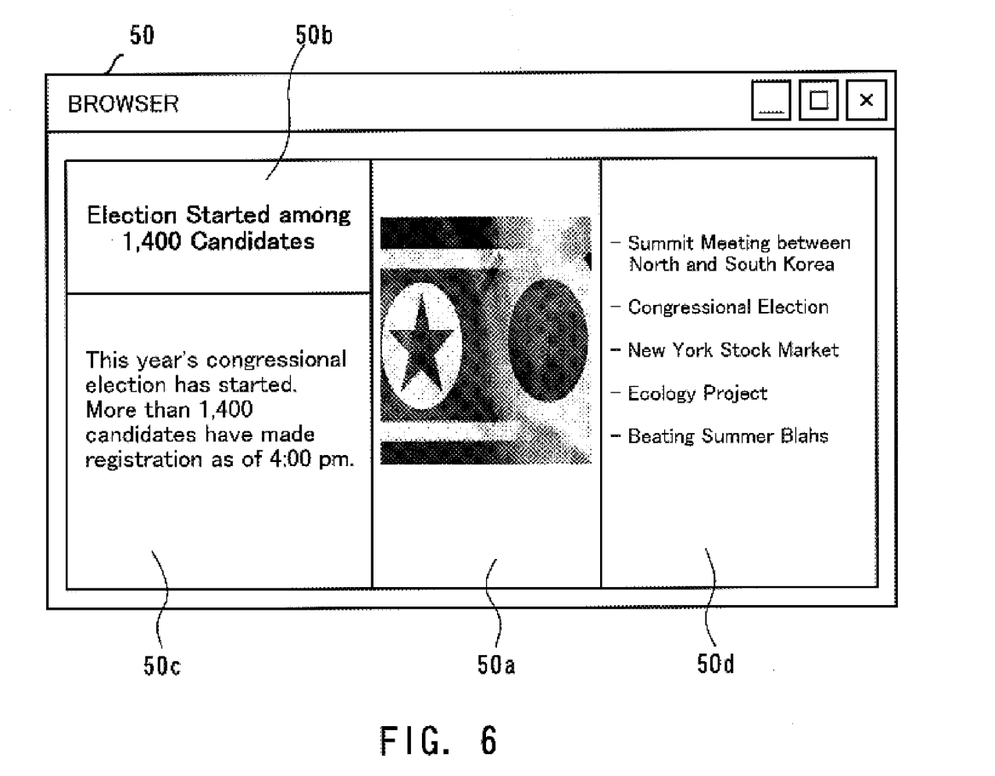
FIG. 6 shows an example of a web page to be subjected to the processing of FIG. 5.

(S20) When a vocal command requesting a particular web page is received from the user, the hyperlink controller 14c asks the server 17 to provide the requested web page data. Suppose, for example, that the requested web page is constructed as shown in FIG. 6. This page displays a three-cell table arranged in the pane 50a of the window 50, the left-most cell being subdivided into two parts. The upper-left cell 50b contains a headline "Election Started among 1,400 Candidates," which is followed by a story in the cell 50c "This year's congressional election has . . . " Further, a graphic image is placed in the center cell 50a, and five menu items are listed in the right-most cell 50d.

(S21) The element structure analyzer 15a receives web page data that is sent from the server 17 in response to the request from the hyperlink controller 14c. The element structure analyzer 15a analyzes the received web page data to find "elements" (or container elements), each of which starts with an opening tag and ends with a closing tag. In HTML documents, each element is assigned a particular meaning. An HTML document has a hierarchical structure of such elements, and the term "blocks" refers to the elements that constitute an HTML document at a certain hierarchical level.

Figure 7:
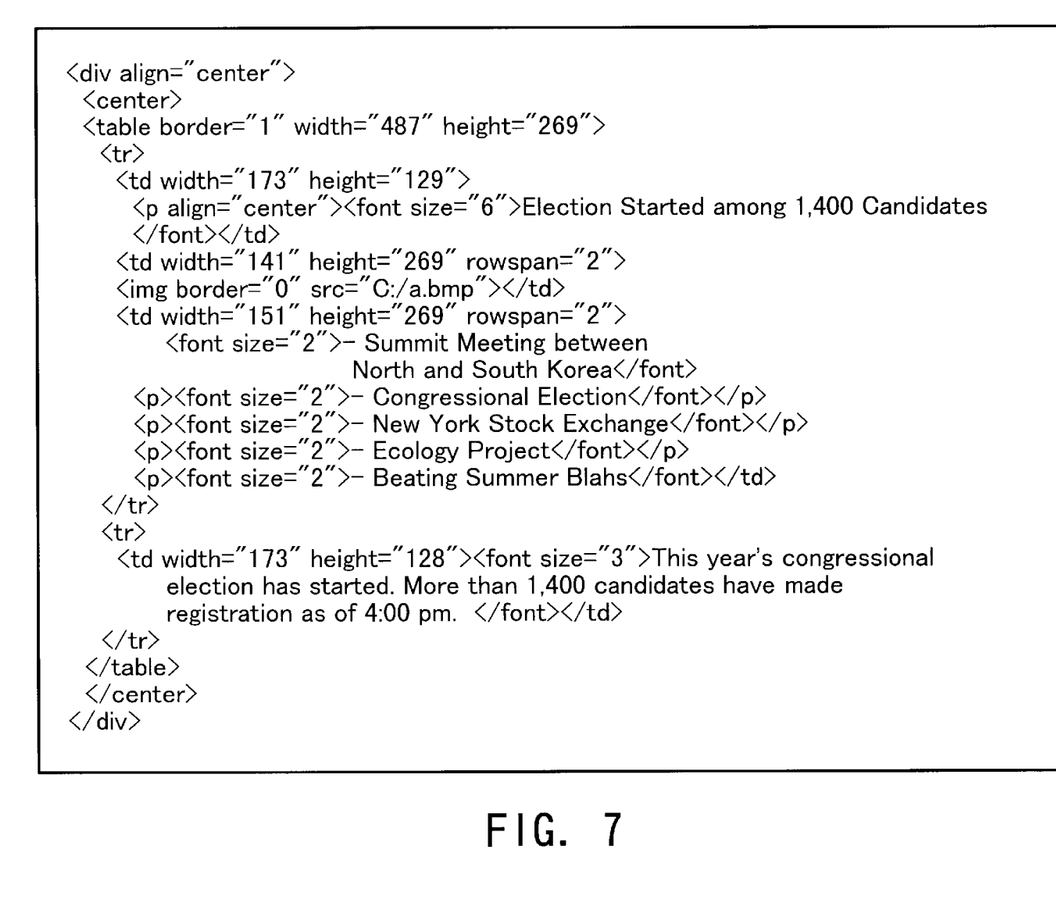
FIG. 7 shows an HTML document corresponding to the web page of FIG. 6.

FIG. 7 shows an example of an HTML document representing the web page of FIG. 6. As seen from this example, an HTML document is made up of text information and various tags representing attributes. The element structure analyzer 15a identifies each element in such web page data. More specifically, the example web page of FIG. 6 has the following three sections: the headline "Election Started among 1,400 Candidates," the story "This year's congressional election has . . . ," and the menu "—Summit Meeting between North and . . . " These sections are recognized as different elements, since they are contained in separate table cells.

(S22) The element structure analyzer 15a determines whether it has finished all elements in the document. If so, the process is terminated. Otherwise, the process advances to step S23.

(S23) The element structure analyzer 15a parses the tags contained in an element identified at step S21, thereby yielding the attributes (e.g., font size) assigned to that element. Take the headline "Election Started among 1,400 Candidates" (FIG. 6), for example. As seen from the sixth line of the source HTML text of FIG. 7, the font size of this element is specified as "6" (<font size="6">).

(S24) The element structure analyzer 15a analyzes the text within the element of interest, yielding its length and other parameters.

(S25) Based on the data obtained at steps S23 and S24, the element structure analyzer 15a determines the priority of the element and enters it to the element table. In the present example (FIG. 6), the headline "Election Started among 1,400 Candidates" is given first place because its font size "6" is the largest among others. The text "This year's congressional election has . . . " and menu "—Summit Meeting between North and . . . " are then ranked second and third, since their font sizes are "3" and "2," respectively.

Figure 8:
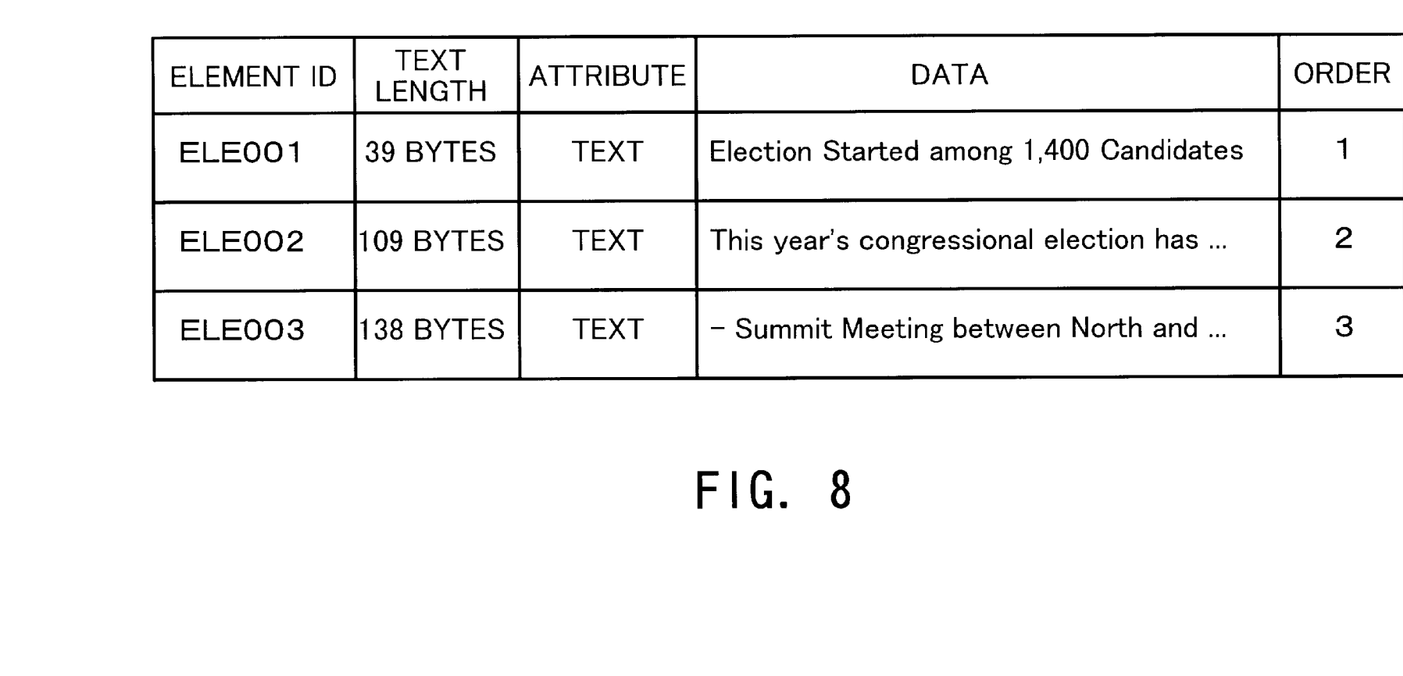
FIG. 8 illustrates an element table which is obtained by applying the process of FIG. 5 to the web page example of FIG. 6.

FIG. 8 illustrates an element table for the web page of FIG. 6. This table presents the three elements of the example web page, together with their ranks. The first table entry, for example, indicates that the headline "Election Started among 1,400 Candidates" has the highest priority.

The above processing steps gives appropriate priorities to the web page elements, depending on their text attributes. The element structure analyzer 15a creates an element table in this way and supplies it to the speech synthesizer 13c via the data output unit 15d, together with the text data. Consulting this element table, the speech synthesizer 13c vocalizes the text data in the specified order. In the present example, the speech synthesizer 13c starts with the headline "Election Started among 1,400 Candidates" at the upper-left cell 50b (FIG. 6). This is followed by the lower-left cell 50c "This year's congressional election has . . . " Lastly, the right-most cell 50d "—Summit Meeting between North and . . . " is vocalized.

According to the above-described embodiment of the present invention, the text data of a web page is divided into blocks, or elements, and prioritized in accordance with their text attributes. The system vocalizes the text data after reordering those blocks according to their priorities. With this feature, the user can reach the most important part of the web page immediately when he/she visits that web site. While the above explanation has assumed the use of font size specifications as the reference, the blocks may also be evaluated by their text lengths or any other appropriate attributes.

Figure 9:
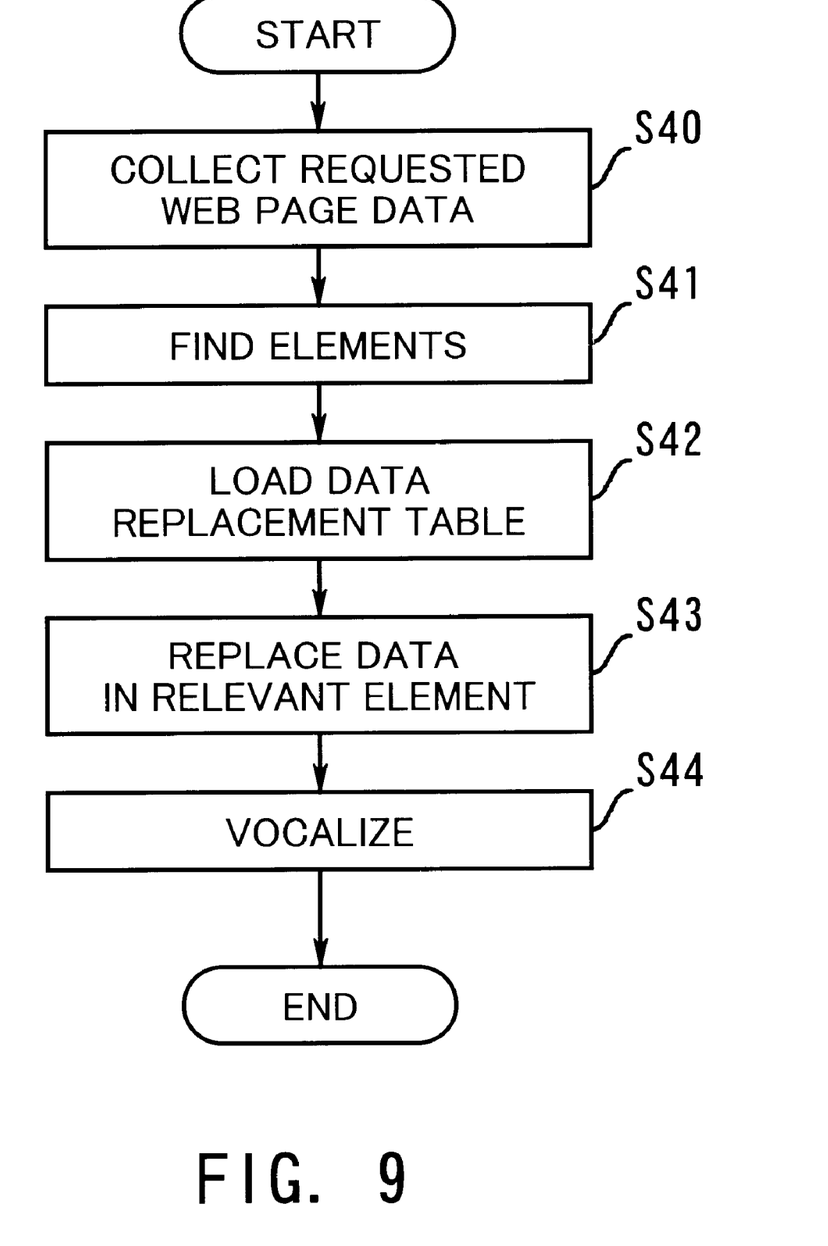
FIG. 9 is a flowchart which explains the operation of a data processing system according to a second aspect of the present invention.

According to a second aspect of the present invention, the data processing system delivers each piece of vocalized text information, together with its associated sound file. This feature will now be discussed in detail below with reference o FIGS. 9 to 13, assuming the same system environment as described earlier in the first aspect of the invention. FIG. 9 is a flowchart which shows the operation of the proposed system, which comprises the following steps.

(S40) When a vocal command requesting a particular web page is received from the user, the hyperlink controller 14c asks the server 17 to provide the requested web page data.

Figure 10:
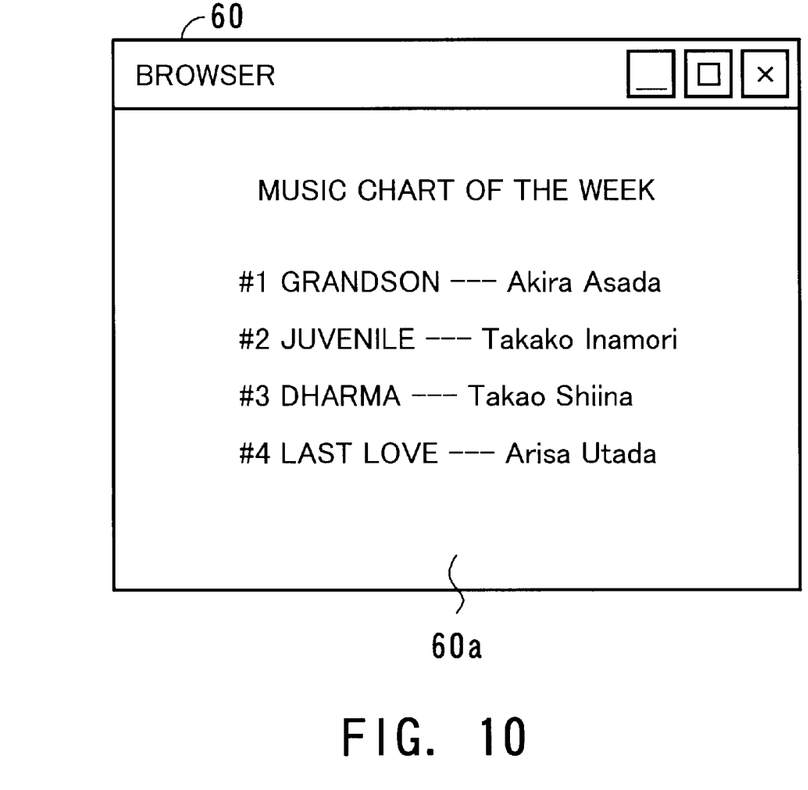
FIG. 10 shows an example of a web page to be subjected to the processing of FIG. 9.
Figure 11:
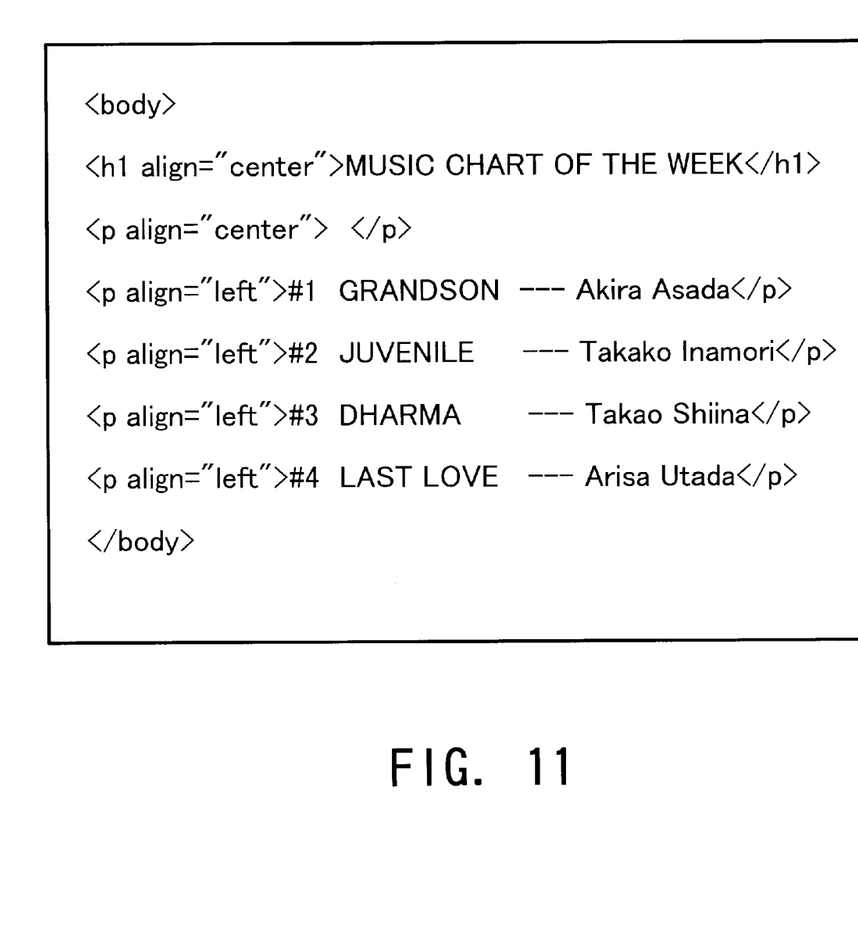
FIG. 11 shows an HTML document corresponding to the web page of FIG. 10.

FIG. 10 shows an example web page. This page lists four top-ranked songs and artists under the heading of "MUSIC CHART OF THE WEEK."

Figure 12:
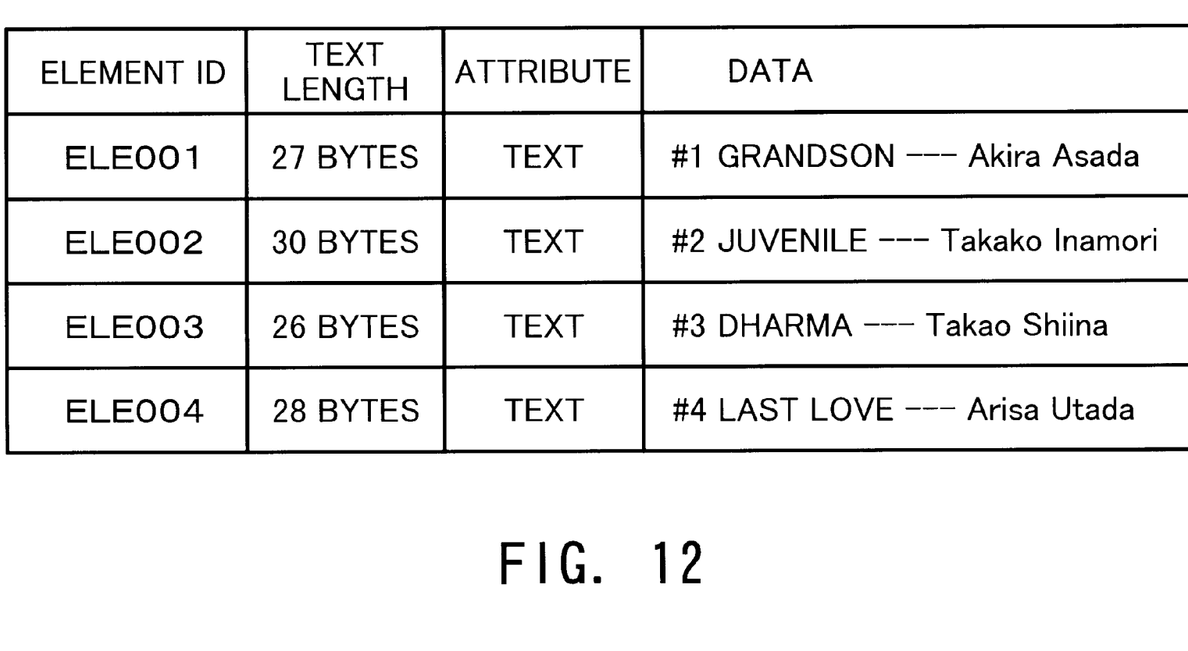
FIG. 12 shows an example of an element table.

(S41) The server 17 transmits the specified web page data in response to the request from the hyperlink controller 14c. The element structure analyzer 15a receives and analyzes that web page data to find its element structure. In the present example of FIG. 10, the element structure analyzer 15a receives and analyzes its source HTML document shown in FIG. 11 and produces an element table which summarizes all relevant elements found in the document. FIG. 12 shows this element table, which stores four instances of text data, along with their respective element IDs, text lengths, and attributes.

(S42) Besides receiving the result from the element structure analyzer 15a, the replacement unit 15c loads a replacement data table from appropriate storage (not shown).

Figure 13:
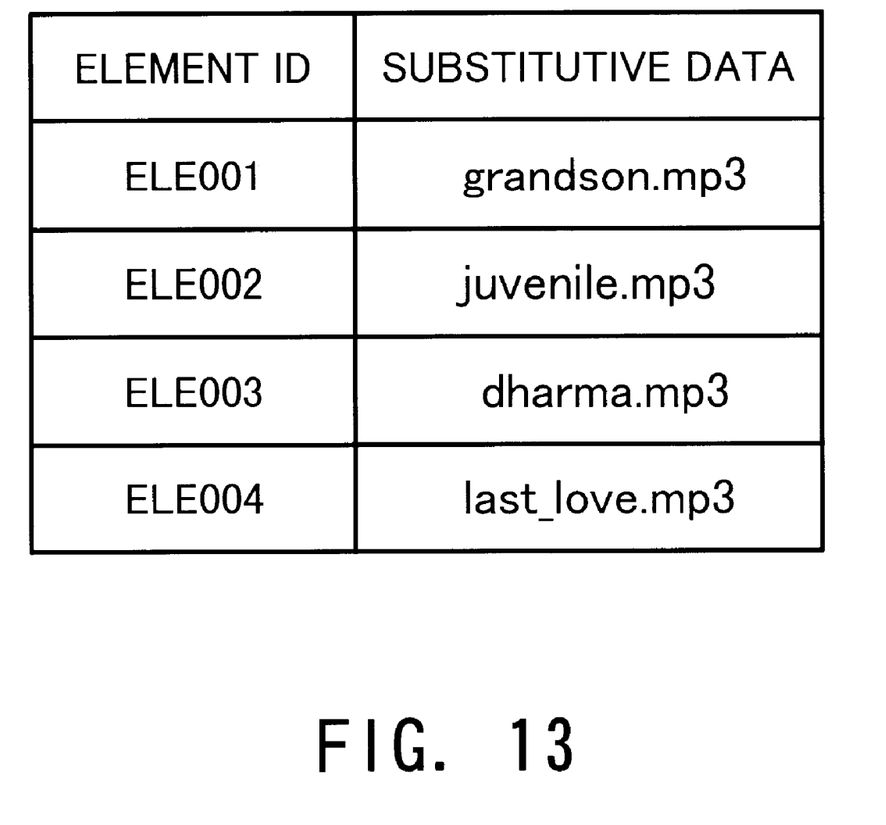
FIG. 13 shows an example of a replacement data table.

The replacement data table is used to manipulate the downloaded web page data by making a substitution or addition of predetermined data. FIG. 13 shows an example of the replacement data table. By using the element ID as the key, the illustrated table assigns a relevant sound file to each of the elements listed in the element table of FIG. 12. Take the first entry of the table, for example. This entry associates the element "ELE001" with a corresponding sound clip file named "grandson.mp3." As its filename extension indicates, this file is encoded in the MPEG layer-3 (MP3) format.

(S43) The replacement unit 15c makes element data substitutions, consulting the above-described replacement data table.

Again, in the present example, the text data "#1 GRANDSON—Akira Asada" in the first element is replaced with a filename "grandson.mp3" which is linked to a corresponding sound clip file. Alternatively, the replacement data table may be used to give an additional piece of information (described later).

(S44) Supplied with the modified web page data, the speech synthesizer 13c vocalizes its text data, and when a link to the sound data is encountered, it replays the specified sound file.

For the example web page of FIG. 10, the speech synthesizer 13c first produces a speech "MUSIC CHART OF THE WEEK" and then replays the four top-ranked songs one after another.

As mentioned above, the replacement data table may alternatively be used to give an additional piece of text. That is, what is stored in the table as the substitutive data will be inserted to a relevant part of the web page document, while preserving its original text. If this alternative scheme is applied to the present example, a link to a sound clip file "grandson.mp3" is inserted after the text "#1 GRANDSON—Akira Asada." The system then replays that file after vocalizing the original text of the element.

While the above explanation of the invention has assumed that the replacement data table is prepared beforehand for each individual web page for use in the replacement process for a specific web page downloaded from a server, the present invention is not limited to that configuration. Alternatively, the replacement data pairs may be specified in some extended HTML tags. For example, a "Barrier-Free" tag <BF> is implemented as an extension of the HTML tag system, to specify the name of a desired file to be added or substituted. While such BF tags embedded in an HTML document would be simply ignored by ordinary browsers, people who use the data processing system 12 as their portal site will be able to enjoy the feature of those embedded BF tags. That is, the barrier-free HTML analyzer 15b employed in the data processing system 12 will parse the content of each BF tag to provide its intended function.

Although the above description has illustrated a conversion from textual information to sound information, the scope of the present invention also covers other non-textual content of a web page document. For example, the present invention enables an image in a web page document to be liked with its associated sound file or text data which provides a description of that image. The speech synthesizer 13c will then replay the sound file, or vocalize the text data, when the page is requested. With this feature of the present invention, the user can hear a verbal explanation of an image on the web page.

The proposed processing mechanisms are actually implemented as software functions of a computer system. The process steps of the proposed data processing system are encoded in a computer program, which will be stored in a computer-readable storage medium. The computer system executes this program to provide the intended functions of the present invention. Suitable computer-readable storage media include magnetic storage media and solid state memory devices. Other portable storage media, such as CD-ROMs and floppy disks, are particularly suitable for circulation purposes. Further, it will be possible to distribute the programs through an appropriate server computer deployed on a network. The program file delivered to a user is normally installed in his/her computer's hard drive or other local mass storage devices, which will be executed after being loaded to the main memory.

The above discussion is summarized as follows. According to one aspect of the present invention, the text data of a web page is divided into blocks, and prioritized in accordance with their text attributes. The system vocalizes the text data after reordering those blocks according to their priorities.

According to another aspect of the present invention, the data processing system employs a replacement data table to replace a part of a given web page data with a predetermined piece of information such as a link to a sound clip file. This feature enables visually-impaired users to receive information about non-textual content (e.g., images) of a web page, in addition to the vocalized text information.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data processing system which provides a user with vocalized information of web pages that are written in a markup language, comprising:
    call reception means for accepting a call from the user's telephone set;
    speech recognition means for recognizing a verbal message being received from the user's telephone set;
    web page data collection means, responsive to a request for a particular web page which is recognized by said speech recognition means, for making access to the requested web page to obtain web page data therefrom;
    text data extraction means for extracting text data from the obtained web page data on a block basis;
    attribute extraction means for extracting attributes of each of the blocks of text data extracted by said text data extraction means;
    vocalization order decision means for determining in what order to vocalize the blocks, based on the attributes extracted by said attribute extraction means; and
    vocalizing means for vocalizing the text data contained in each block, according to the vocalization order that is determined by said vocalization order decision means.

2. The data processing system according to claim 1, wherein the attributes include a font size specified in each block of text data and
    wherein said vocalization order decision means determines the vocalization order for the web page data according to the font size of each block.

3. The data processing system according to claim 1, wherein the attributes include a text length of each block, and
    wherein said vocalization order decision means determines the vocalization order for the web page data according to the text length of each block.

4. A computer-readable medium storing a program which provides a user with vocalized information of web pages that are written in a markup language, the program causing a computer system to function as:
    call reception means for accepting a call from the user's telephone set;
    speech recognition means for recognizing a verbal message being received from the user's telephone set;
    web page data collection means, responsive to a request for a particular web page which is recognized by said speech recognition means, for making access to the requested web page to obtain web page data therefrom;
    text data extraction means for extracting text data from the obtained web page data on a block basis;
    attribute extraction means for extracting attributes of each of the blocks of text data extracted by said text data extraction means;
    vocalization order decision means for determining in what order to vocalize the blocks, based on the attributes extracted by said attribute extraction means; and
    vocalizing means for vocalizing the text data contained in each block, according to the vocalization order that is determined by said vocalization order decision means.

5. A data processing system which provides a user with vocalized information of web pages that are written in a markup language, comprising:
    call reception means for accepting a call from the user's telephone set;
    speech recognition means for recognizing a verbal message being received from the user's telephone set;
    web page data collection means, responsive to a request for a particular web page which is recognized by said speech recognition means, for making access to the requested web page to obtain web page data therefrom;
    a replacement data table that associates particular text elements in the web page data with links to corresponding sound clip files;
    insertion means for inserting a link to a sound clip file into the web page data as a substitute or additional piece of text for a particular text element therein that matches with an entry of said replacement data table; and
    vocalizing means for vocalizing the web page data that has been processed by said insertion means and when the inserted links are encountered, replaying the corresponding sound clip files.

6. The data processing system according to claim 5, wherein said replacement data table is supplied from a server, being embedded in the web page data.

7. The data processing system according to claim 5,
    wherein said replacement data table further associates particular image references in the web page data with links to corresponding sound clip files,
    wherein said insertion means inserts the links to corresponding sound clip files in place of the image references in the web page data, consulting said replacement data table, and
    wherein when the inserted links are encountered, said vocalizing means replays the corresponding sound clip files.

8. The data processing system according to claim 5, wherein said replacement data table is loaded, which is provided for each instance of web page data.

9. The data processing system according to claim 5, wherein:
    said replacement data table further associates particular image references in the web page data with predetermined pieces of text;
    said insertion means inserts the predetermined pieces of text in place of the image reference in the web page data, consulting said replacement data table; and said vocalizing means vocalizes the text inserted in place of the image references in the web page data.

10. A computer-readable medium storing a program which provides a user with vocalized information of web pages that are written in a markup language, the program causing a computer system to function as:

call reception means for accepting a call from the user's telephone set;

speech recognition means for recognizing a verbal message being received from the user's telephone set;

web page data collection means, responsive to a request for a particular web page which is recognized by said speech recognition means, for making access to the requested web page to obtain web page data therefrom;

a replacement data table that associates particular text elements in the web page data with links to corresponding sound clip files;

insertion means for inserting a link to a sound clip file into the web page data as a substitutive or additional piece of text for a particular text element therein that matches with an entry of said replacement data table; and vocalizing means for vocalizing the web page data that has been processed by said insertion means, and when the inserted links are encountered, replaying the corresponding sound clip files.

* * * * *